United States Patent [19]

Pellon et al.

[11] Patent Number: 4,859,757

[45] Date of Patent: Aug. 22, 1989

[54] NOVEL PROPYLENE POLYMERS

[75] Inventors: Brian J. Pellon; George C. Allen; Michael P. Hughes, all of Odessa, Tex.

[73] Assignee: Rexene Products Company, Odessa, Tex.

[21] Appl. No.: 184,225

[22] Filed: Apr. 21, 1988

Related U.S. Application Data

[63] Continuation-in-part of Ser. No. 880,453, Jun. 30, 1986, abandoned.

[51] Int. Cl.$^4$ ............................................. C08F 210/16
[52] U.S. Cl. ..................................... 526/348; 526/125
[58] Field of Search .......................................... 526/348

[56] References Cited

U.S. PATENT DOCUMENTS

| 3,300,459 | 11/1967 | Natta et al. | 526/348 |
| 3,789,036 | 1/1974 | Longi et al. | 526/125 |
| 3,933,934 | 1/1976 | Bailly et al. | 526/125 |
| 3,951,935 | 4/1976 | Engelmann | 526/124 |
| 4,309,522 | 1/1982 | Dietrich et al. | 526/158 |
| 4,322,514 | 3/1982 | Miyoshi et al. | 526/125 |
| 4,415,718 | 11/1983 | Miyoshi et al. | 526/125 |

FOREIGN PATENT DOCUMENTS 2127368  10/1972  France .

Primary Examiner—Edward J. Smith
Attorney, Agent, or Firm—Margareta LeMaire

[57] ABSTRACT

Novel, substantially amorphous copolymers of propylene and ethylene are disclosed. The polymers have properties which make them applicable for use, e.g., as hot melt adhesives and as blending components in roofing materials.

8 Claims, No Drawings

NOVEL PROPYLENE POLYMERS

This application is a continuation-in-part copending application Ser. No. 880,453 filed June 30, 1986, now abandoned.

BACKGROUND OF THE INVENTION

In the manufacture of propylene homopolymers and copolymers, conventional polymerization techniques being unsupported catalyst result in the simultaneous production of substantial quantities of atactic polymer in addition to the desired product of high crystallinity and isotacticity. Various methods have been employed for the purification and separation of these two polymers. The by-product, i.e., the atactic polymer of low crystallinity is being utilized commercially as a component in various adhesive compositions, roofing materials, caulking compounds, etc.

Recently, developments have been made of new catalysts which are highly active and more stereospecific than the aforementioned conventional catalysts. The proportion of atactic polymer in the polymers produced employing these catalysts are substantially reduced and therefore the polymer product generally does not require any purification for removal of the atactic or low crystalline polymer. Because of the rapid adaptation of existing polymer facilities to the use of these new catalysts, there has been generated a serious shortage of low crystalline, atactic polymers.

In the prior art processes have been disclosed for the preparation of ethylene-propylene copolymers of low crystallinity. Thus, U.S. Pat. No. 3,951,935 to Englemann, No. 3,933,934 to Bailly et al. and No. 3,789,036 to Longi et al. as well as French Pat. No. 2,127,368 deal with direct polymerization of ethylene and propylene using titanium-based catalysts. U.S. Pat. No. 3,300,459 discloses the preparation of an ether extract of a vanadium-catalyzed ethylene-propylene copolymer. None of these copolymer products have the properties required of the novel polymers of this invention.

It is, therefore, an object of the present invention to provide a novel amorphous polymer of propylene and ethylene, having improved physical properties.

THE INVENTION

In accordance with the present invention there is provided a substantially amorphous random copolymer consisting essentially from about 10 wt % to about 30 wt % of ethylene and from about 70 to about 90 wt % of propylene and said copolymer having a tacticity index m/r ranging between about 3 and about 4 and having no significant propylene inversion in the molecular structure as determined by $^{13}$C NMR spectra.

The tacticity index m/r is determined directly by $^{13}$C Nuclear Magnetic Resonance (NMR). The "m" and "r" describe the stereochemistries of pairs of contiguous propylene groups bonded to one or more ethylene groups, "m" referring to meso and "r" to racemic. An m/r ratio of 1.0 describes a syndiotactic polymer and an m/r ratio of 2.0 a truly atactic material. An isotactic material theoretically will have a ratio approaching infinity and many by-product atactic polymers have sufficient isotactic content to result in ratios of 50 and above. It has been found that the m/r ratio substantially agrees with the number average sequence length n of like groups, i.e., meso and racemic groups in case of propylene homopolymer produced under the same conditions as the random copolymer, except for the absence of ethylene in the feed. Thus, it is established that the tacticity is independent of comonomer content in the polymer. Also, the comonomer such as the ethylene is distributed through the polymer molecule in the most random fashion. The method used in calculating n for the homopolymer is disclosed in J. C. Randall, J. POLYM. SCI., POLYM. PHYS. ED., 14, 2083 (1976). The tacticity index m/r is obtained by inverting the r'/m' ratio calculated according to the method devised by H. N. Cheng, MACROMOLECULES, 17, 1050 (1984).

Propylene inversion can be quantified from the NMR spectra by comparing the frequencies of occurrence of structures A and B depicted below.

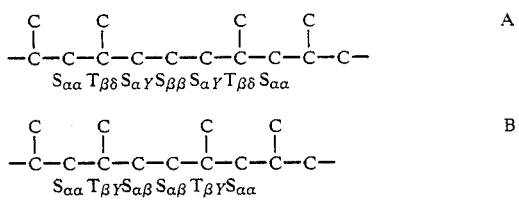

One uses the integrated intensities of the pertinent resonances to obtain the value for the ratio $$[-(CH_2)_2-]/[-(CH_2)_3-] = 0.5 \times S_{\alpha\beta}/[0.33 \times (S_{\alpha\gamma}+S_{\beta\beta})]$$

where the numerator represents the inverted polypropylene sequence PP and the denominator the non-inverted sequence PEP. This relation is disclosed in detail in a paper by Doi, et al., [MAKROMOL. CHEM., 185, 1827 (1984)]. No signficant propylene inversion is present at ratios of about 0.15 and below.

The novel polymer hasa very low heat of fusion, typically less than about 0.6 cal/g, as described by Differential Scanning Calorimetry techniques (DSC), a further indication of the amorphous nature of the polymer and the lack of significant crystallinity in the polymer structure.

The polymers of this invention are prepared by a process which comprises polymerizing from about 70 to 90 wt. % propylene and from about 10 to about 30 wt % ethylene at a temperature between about 130° F. and about 175° F. in the presence of a particular catalyst composition. Although the polymerization can be carried out in a batch reactor, it is preferred to utilize a continuous process to achieve the most random incorporation of the comonomer.

The pressure should be sufficient to maintain propylene in the liquid phase, usually pressures in the range between about 400 psig and about 550 psig are suitable. The preferred temperature is between about 150° F. and about 160° F.

Hydrogen is added to the polymerization reactor for control of polymer molecular weight and other properties at concentrations generally about 7 to 10 times the amount conventionally used in the manufacture of isotactic polymer. Moreover, as the ethylene content of the copolymer is increased it is necessary to increase the hydrogen concentration in the reactor to obtain a copolymer having a constant melt viscosity. As an example, for a 100% increse in ethylene content about a 50% to 150% increase in hydrogen is required. The concentration of hydrogen in the total feed to the reaction zone generally ranges between about 0.7 and about 3.0 mol % preferably between about 1.2 and about 2.5 mol %.

The specific catalyst composition contains a solid, supported catalyst component and an organoaluminum component. The supported catalyst component is comprised of an active transition metal compound such as titanium tetrahalide mixed with an enhanced support comprised of magnesium halide and aluminum trihalide. The molar ratio of magnesium halide to aluminum trihalide is about 8:0.5–3.0 and preferably about 8:1.0–1.5.

The molar ratio of magnesium halide to titanium tetrahalide is between about 8:0.1–1.0 and preferably about 8:0.4–0.6. A critical feature of the solid supported catalyst component is that no electron donor compounds should be used in any of the catalyst manufacturing steps. Also, the polymerization process using the catalyst should be carried out in the absence of added electron donors. The preferred halides are chlorine.

Any of the general methods described in U.S. Pat. Nos. 4,347,158 and 4,555,496 (hereby incorporated by reference in this application) can be used in preparing the solid supported catalyst component except that these methods must be modified to exclude the use of electron donor compounds. Briefly, the modified method involves co-comminuting magnesium halide and aluminum trihalide in the absence of an electron donor and then co-comminuting the catalyst support so formed with titanium tetrahalide, also in the absence of an electron donor.

The solid catalyst component is used in conjunction with an organoaluminum co-catalyst, which is a mixture of trialkylaluminum and alkylaluminum halide, wherein each alkyl group contains between 1 and 9 carbon atoms, and wherein the alkylaluminum halide contains at least one halide group. The preferred halide is chloride and the alkyl groups are preferably ethyl groups. The invention will be described hereinafter in connection with the preferred catalyst system. The triethylaluminum content ranges between about 15 and about 90 mol % in the total organoaluminum component. At lower than 15% triethylaluminum concentrations, the polymer productivity is drastically reduced and diethylaluminum chloride alone fails completely to promote polymerization. At higher than 90 mol % some of the physical properties of this polymer are affected in an undesirable manner. The use of diethylaluminum chloride is not for the purpose of promoting polymerization but very importantly, to impart to the catalyst system the ability to produce polymer with desirable properties. The preferred co-catalyst is a mixture containing from about 40 to 60 mol % triethylaluminum and about 60 to about 40 mol % diethylaluminum chloride. The molar ratio of total organoaluminum co-catalyst to titanium-containing catalyst component, i.e., Al/Ti ratio should range between about 50:1 and about 600:1, preferably between about 90:1 and about 300:1.

The polymerization is carried out in a stirred reactor at average residence times between about 1 hour and about 3 hours. Sufficient catalyst equantities are fed to the reactor to result in a polymer content in the reactor slurry of from about 30 wt % to about 60 wt %. The reactor effluent is withdrawn from the reactor, and unreacted monomer and hydrogen is flashed from the product polymer.

The polymer contains very low concentrations of catalyst residues, e.g., the total ash content is generally less than about 500 ppm and the titanium content no more than 2 ppm, generally less than about 1 ppm.

Various additives can be incorporated into the polymer, such as antioxidants, U.V. stabilizers, pigments, etc.

The compositions of this invention have excellent properties making them useful in a variety of applications, such as for adhesives, caulking and sealing compounds, roofing compositions, cable and wire flooding compounds, and others. By varying the comonomer content in the polymer and hydrogen addition to the reactor, it is possible to tailor the properties for any desired application. The important product properties include melt viscosity, ring and ball softening point, needle penetration, and open time.

The melt viscosity at 375° F. is determined by ASTM test D-3236 using a Brookfield RVT Viscometer and a #27 spindle. Hydrogen is used to control molecular weight and thus melt viscosity. It has been found that at increased ethylene content more hydrogen is required to maintain a certain viscosity level. For use as wire and cable flooding compounds the preferred viscosity is between about 100 and about 500 cps. For hot melt adhesives the desired viscosity range is between about 1000 and about 5000 cps at 375° F., while for other applications such as bitumen-modified product, the polymer component should have a viscosity above 5000 cps, preferably in the range between about 10,000 and about 25,000 cps.

The ring and ball softening point determinations are carried out using ASTM E-28 test method. The variables affecting the softening point are ethylene content of the polymer and the triethylaluminum concentrations in the organoaluminum co-catalyst used in the polymerization process. A decrease in the ethylene content as well as in diethylaluminum chloride concentration in the co-catalyst both cause an increase in the ring and ball softending point. The preferred range for this property is between about 235° F. and about 300° F. Needle penetration is another test which measures the softness of the material, in this case by the resistance to penetration according to ASTM test method D-1321. Typically, the penetration values of the copolymers of this invention range between 10 and about 75 dmm (1 dmm=0.1 mm). The same process variables affect this property as in the case of the ring and ball softening pont.

Perhaps one of the most important tests of a hot melt adhesive is the open time. This test is an indication of the elapsed time available between adhesive application to kraft paper and bonding of a kraft paper laminate. This is a very important property for the user, as he must know how soon after applying the adhesive he must add the second sheet of paper. In this test, an 8½"×11" sheet of kraft paper, rough side up is taped to a drawdown plate. A polymer sample is heated to 375° F. along with a Bird drawdown applicator. When at temperature, the applicator is placed at the top of the kraft paper and a small puddle of molten polymer is poured near the edge. The polymer is drawn into a smooth film, and as soon as the bottom of the paper is reached, a stopwatch is started. At 10-second intervals, pre-cut strips of kraft paper (rough side down, transverse machined direction) are placed across the film and pressed into place with a rubber roller. After the last strip is applied, and a subsequent waiting period of 5 minutes, the strips are removed in a smooth, brisk motion. The open time is defined as the longest time when 90% or more of the fiber remains. The open times should preferably range between 10 and 60 seconds.

An additional benefit of the polymers of this invention is that since they contain extremely small quantities of catalyst residues because of the very large productivity rates of the specific catalyst used in the polymerization, there is no need to remove these small amounts of catalysts from the polymer.

The following examples illustrate the invention.

EXAMPLES 1-8

Polymers were prepared in large scale continuous pilot plant operations, wherein monomers, hydrogen and catalyst components were separately and continuously charged to a stirred reactor, the total monomer feed rate corresponding to about a 2-hour residence time in the reactor. The organoaluminum compound of the catalyst system was a heptane solution of an equimolar mixture of triethylaluminum (TEA) and diethylaluminum chloride (DEAC). The solid supported titanium tetrachloride catalyst component had a titanium content of about 2.5 wt % and was prepared by a modification of the preferred technique disclosed in U.S. Pat. No. 4,347,158, i.e., modified only in that all process steps were carried out in the absence of any electron donor compounds. The solid catalyst component was pumped into the reactor as a 10 wt % mixture in a blend of petrolatum and mineral oil in a 50/50 weight ratio. The two catalyst components were added at rates directly proportioned to the polymer production rates and in amounts sufficient to maintain the polymer solids concentration in the reactor slurry at values usually in the range between 40% and about 60%. The catalyst productivity (lb polymer/lb of Ticatalyst component) was calculated in each case from the polymer slurry withdrawal rate, solids content in the slurry and the titanium catalyst addition rate. The product polymer was separated from unreacted monomer, stabilized with Isonox ®129 and then subjected to testing. Table 1 summarizes the pertinent operating conditions and the results of physical testing. The product characteristics of Example 1-6 fall within the claimed limits of this invention, while those of Comparative Examples 7 and 8 reflect the insufficient amount of ethylene groups in the interpolymers, i.e., high softening point, low needle penetration, high heat of fusion.

Table 2 lists the physical properties of Examples 1-8 and also of fifteen atactic polymers (Commercial Examples A-O) obtained from various manufactures in the United States, Europe, and Asia. Commercial Sample A is a terpolymer of ethylene, propylene, and a major proportion of butene-1, while the remaining samples are either propylene homopolymers or ethylene-propylene copolymers. Samples B, C, G, and H are believed to have been produced in processes under conditions deliberately selected to yield relatively large concentrations of atactic polymer in the total polymer product. It is further believed that the atactic portions have subsequently been removed from the isotactic by-product by solvent treatment. Samples D-F and I-O are believed to be atactic polypropylene by-products. None of these commercial samples have the physical properties required of the polymer products of this invention.

TABLE 1

| Example No. | 1 | 2 | 3 | 4 | 5 | 6 | COMP 7 | COMP 8 |
|---|---|---|---|---|---|---|---|---|
| Reactor Temp, °F. | 157 | 150 | 154 | 154 | 157 | 142 | 155 | 155 |
| Reactor Press, psig | 456 | 434 | 466 | 484 | 491 | 495 | 448 | 442 |
| Propylene, lbs/hr | 111 | 111 | 111 | 111 | 102 | 111 | 112 | 124 |
| Ethylene, lbs/hr | 8.8 | 9.0 | 12.0 | 12.0 | 8.5 | 12.9 | 5.0 | — |
| Hydrogen, lbs/hr | 0.14 | 0.05 | 0.06 | 0.10 | 0.06 | 0.14 | 0.10 | 0.07 |
| Al/Ti, mol ratio | 311 | 289 | 301 | 299 | 263 | 291 | 299 | 533 |
| Reactor Solids, wt % | 60.5 | 47.7 | 51 | 51 | 32 | 38 | 61 | 59 |
| Productivity, lbs/lb catalyst | 55,420 | 34,390 | 33,520 | 35,500 | 23,950 | 30,260 | 37,440 | 20,680 |
| Ethylene Content, wt % | 12.2 | 13.5 | 14.3 | 15.5 | 17.5 | 25.7 | 4.0 | 0 |
| m/r Ratio (or $\bar{n}$) | 3.1 | 3.3 | 3.8 | 3.7 | 3.7 | 3.5 | 3.2 | 3.3 |
| Inversion Ratio | 0.11 | 0.08 | 0.12 | 0.09 | 0.08 | 0.09 | — | — |
| $\Delta H_f$, cal/g (DSC) | 0.50 | 0.50 | 0.27 | 0.33 | 0.16 | 0.00 | 1.79 | 4.37 |
| Melt Viscosity @ 375° F., cps | 3,000 | 15,000 | 7,750 | 3,780 | 9,210 | 7,900 | 2,100 | 2,800 |
| Open Time, seconds | 10 | 20 | 20 | 30 | 20 | >60 | <10 | 0 |
| Ring and Ball Softening Point, °F. | 266 | 257 | 252 | 251 | 253 | 237 | 279 | 304 |
| Needle Penetration, 0.1 mm | 37 | 28 | 43 | 45 | 41 | 71 | 17 | 8 |

TABLE 2

| Product Property | | Ethylene, wt % | m/r or $\bar{n}$ | Inversion Ratio | $\Delta H_f$, cal/g | Melt Visc. @ 75° F. cps | Open Time, secs | Soft Pt., °F. | Needle Pen., 0.1 mm |
|---|---|---|---|---|---|---|---|---|---|
| Example 1 | | 12.2 | 3.1 | 0.11 | 0.50 | 3,000 | 10 | 266 | 37 |
| Example 2 | | 13.5 | 3.3 | 0.08 | 0.50 | 15,000 | 20 | 257 | 28 |
| Example 3 | | 14.3 | 3.8 | 0.12 | 0.27 | 7,750 | 20 | 252 | 43 |
| Example 4 | | 15.5 | 3.7 | 0.09 | 0.33 | 3,780 | 30 | 251 | 45 |
| Example 5 | | 17.5 | 3.7 | 0.08 | 0.16 | 9,210 | 20 | 253 | 41 |
| Example 6 | | 25.7 | 3.5 | 0.09 | 0.00 | 7,900 | >60 | 237 | 71 |
| Comp. 7 | | 4.0 | 3.2 | — | 1.79 | 2,100 | <10 | 279 | 17 |
| Comp. 8 | | 0 | 3.3 | — | 4.37 | 2,800 | 0 | 304 | 8 |
| Commercial Sample | A* | 5.0 | — | — | 0.10 | 22,000 | 60 | 176 | 13 |
| | B | 8.6 | 2.1 | — | 0.10 | 11,000 | 40 | 284 | 29 |
| | C | 3 | 2.1 | — | 1.04 | 1,300 | >60 | 287 | 43 |
| | D | 8.0 | 1.6 | — | 0.00 | 250 | — | — | — |
| | E | 22.1 | 49.0 | — | 0.93 | >500,000 | — | — | — |
| | F | 17.1 | 99.0 | — | 0.75 | 56,000 | — | — | — |
| | G | 0 | 2.7 | — | 3.81 | 2,000 | 5 | 314 | 10 |
| | H | 0 | 2.9 | — | — | 2,400 | 0 | 295 | 12 |
| | I | 0 | 2.1 | — | 0.44 | 500 | 0 | — | — |
| | J | 0 | 2.0 | — | 0.00 | 100 | — | — | — |
| | K | 0 | 2.1 | — | 1.38 | 3,200 | — | — | — |

TABLE 2-continued

| Product Property | | Ethylene, wt % | m/r or n̄ | Inversion Ratio | ΔH$_f$, cal/g | Melt Visc. @ 75° F. cps | Open Time, secs | Soft Pt., °F. | Needle Pen., 0.1 mm |
|---|---|---|---|---|---|---|---|---|---|
| | L | 0 | 2.5 | — | 1.12 | 900 | — | — | — |
| | M | 0 | 2.7 | — | 4.21 | 4,300 | — | — | — |
| | N | 0 | 2.5 | — | 0.50 | 250 | — | — | — |
| | O | 0 | 1.9 | — | 0.25 | 350 | — | — | — |

*Terpolymer ethylene/propylene/butene-1

EXAMPLES 9-11

The experiments were performed in a 1-liter, jacketed autoclave equipped with a magnetically coupled stirrer. The temperature of the autoclave was controlled by the use of a mixture of equal weights of glycol and water as the heat transfer fluid flowing through the jacket. The temperature of this fluid was controlled by a microprocessor whose temperature indicator was an iron/constantin thermocouple inside the autoclave. With this system, set point temperature could be maintained ±0.2° C. All monomers were polymerization grade, 99.9% pure, and were also passed through molecular sieve beds, as well as beds of copper catalyst for oxygen removal, prior to use. Hydrogen was ultra-high purity, 99.99% and used as is. Aluminum alkyl solutions were purchased as 25% W/W in normal heptane and were used as is. One wt % catalyst slurries were prepared in degassed mineral oil using catalysts of the same type as that in Examples 1-8. prior to each use, the autoclaves were heated to 90° C. with a slow nitrogen purge for 30 minutes. After cooling to 30° C., the nitrogen atmosphere was replaced with a propylene purge. Alkyl solutions and catalyst slurries were prepared in septum vials in dry boxes (nitrogen atmosphere), purged with nitrogen upon removal, and pressurized slightly to avoid contamination. Alkyl solutions and catalyst slurries were introduced into the reactors using hypodermic syringes, previously cleaned with de-ionized water, dried at 120° C., and purged with nitrogen prior to use. In Example 9, 0.34 ml TEA, 0.34ml DEAC (Al-1.77×10$^{-3}$ mole/l), and 0.58 ml of 1% W/W catalyst slurry (2.5% W/W titanium content) were added to the autoclave. Hydrogen was added to equal a partial pressure of 70 psig. 0.6 liters of propylene was introduced using a sight gauge and nitrogen pressure. The reactor content was heated to 60° C. and maintained while stirring at 500 rpm. As soon as the temperature stabilized at 60° C. (5-10 minutes), ethylene was added to the reactor to maintain a constant overpressure of 50 psig greater than the reactor pressure. After 1 hour, the temperature was lowered and excess propylene vented. The ethylene-propylene copolymer was dried under vacuum at 40° C. overnight.

Comparative Examples 10 and 11 were carried out using the procedure described in connection with Example 9 except for the alkyl co-catalyst addition. In Example 10 0.68 ml TEA was used exclusively while in Example 11 the same amount of DEAC only was added. Table 3 lists the pertinent data of these comparative examples.

TABLE 3

| Example No. | 9 | Comp 10 | Comp 11 |
|---|---|---|---|
| Co-Catalyst: | | | |
| TEA, % | 50 | 100 | 0 |
| DEAC, % | 50 | 0 | 100 |
| Catalyst Efficiency, Kg/g | 41.2 | 40.0 | 0.0 |

TABLE 3-continued

| Example No. | 9 | Comp 10 | Comp 11 |
|---|---|---|---|
| Ethylene, wt. % | 21.1 | 18.1 | — |
| m/r | 3.3 | 4.2 | — |
| Melt Viscosity @ 375° F., cps | 2810 | 3700 | — |
| Open Time, secs | >60 | >60 | — |
| Softening Point, °F. | 260 | 275 | — |
| Needle Penetration, 0.1 mm | 71 | 43 | — |

As seen from the above data, the use of 100% TEA instead of a mixture of TEA and DEAC (as in Example 9) resulted in a higher ratio of the polymer product. Also, the softening point and needle penetration values were affected in a detrimental way. The use of 100% DEAC as co-catalyst resulted in no formation of polymer.

COMPARATIVE EXAMPLES 12-14

The polymer of Example 12 was prepared essentially in accordance with the procedure set forth in Example 4 of U.S. Pat. No. 3,933,934 to Bailly et al. Thus, to a 1-liter, 3-neck flask in the dry box, there were added 4.86 g magnesium powder, 7.11 g n-propyltitanate, 4.75 g titanium tetrachloride and 160 ml of n-heptane. The mixture was heated to 80° C. with stirring and maintained at that temperature for 6 hours, while 37 g of n-butylchloride were added dropwise. The temperature was then increased and maintained at 90° C. for 0.5 hours. The supernatant liquid was decanted and the precipitate dried under vacuum. 37.5 of a dark brown, metallic powder were obtained.

Subsequently, a 1-liter reactor was charged under nitrogen atmosphere with 400 ml of n-heptane, 1.1 ml of 25% triethylaluminum in heptane (0.182 g) and 0.18 g of the above described catalyst as a 5% dispersion in mineral oil. The temperature was increased to 80° C. while stirring, then 13 psig of hydrogen (0.4 liters) was added bringing the total reactor pressure to 25 psig. A gas mixture of 76.8 mole % of propylene and 23.2 mole % of ethylene was added for 6 hours to maintain a reactor pressure of 100 psig, 159 g of polymer was recovered. The results of analytical testing of the polymer are shown in Table 4.

In Example 13 a polymerization was conducted following the procedure set forth in Example 4 of French Pat. No. 2,127,368 to Naphtha-Chimie. A 1-liter reactor was charged under a nitrogen blanket with 500 ml n-heptane, 1.54 ml of 25% triethylaluminum in n-heptane (0.275 g), and 3.5 ml of 10% β-titanium trichloride in mineral oil. The temperature was increased to 80° C. with stirring, after which 14.5 psig of hydrogen was added, followed by addition of 68.4/31.6 mole/mole gas mixture of propylene/ethylene up to a pressure of 87 psig which was maintained for 2 hours. 52 g of a polymer were recovered and analyzed, the data being presented in Table 4.

The preparation of the ether extract composition of Example 14 was conducted according to the procedure shown in Example 1 of U.S. Pat. No. 3,300,459 to Natta et al. Thus, to a 1-liter autoclave purged with nitrogen were added 150 ml heptane, 0.0125 mole trihexylaluminum as a 21 wt % solution in heptane, 0.04 mole $VOCl_3$, 175 ml propylene-propane mixture containing 93% propylene and finally 6 g ethylene. The temperature was 30° C. and the pressure 235 psig. The temperature was increased to 45° C. with stirring. An immediate exotherm to 64° C. was observed. After 5 minutes, the temperature had dropped to 43° C. and the pressure was 150 psig. The reactor was cooled and vented to stop polymerization. The polymer was removed and washed with 600 ml methanol, and 15 gm of polymer product was obtained.

The polymer was then subjected to successive extractions with acetone at reflux for 1 hour and then with ether at reflux for 6 hours. The ether extract was subjected to $^{13}C$ NMR analysis and the pertinent results are shown in Table 4.

TABLE 4

| Example No | 12 | 13 | 14 |
|---|---|---|---|
| Ethylene Content, wt % | 29.5 | 39.0 | 24.7 |
| $H_f$ | 0.09 | 1.54 | 0.1 |
| m/r Ratio | 7.1 | 12.5 | 3.3 |
| Inversion Ratio | 0.09 | 0.04 | 1.46 |

The data clearly show that none of the polymers have the unique properties of the claimed composition of the present invention. Specifically, comparative Examples 12 and 13 do not have m/r ratios in the critical range of from about 3 to about 4.

In addition, due to the use in comparative Example 14 of a homogeneous vanadium catalyst rather than a titanium catalyst, the polymer of this example had a significantly different molecular structure than either of those of Examples 12 and 13 as well as of those of Examples 1–6 and 9.

COMPARATIVE EXAMPLES 15 AND 16

These examples were carried out under conditions close to those of Example 6 of U.S. Pat. No. 3,789,036 to Longi et al. Thus, the catalyst was prepared by adding 29.7 g anhydrous magnesium chloride and 1.25 g titanium tetrachloride to a steel mill having a volume of 0.6 l and provided with 191 stainless steel balls weighing 1683 g. The mixture was milled under a nitrogen atmosphere for 64 hours at 20° C.

In comparative Example 15, a 1-liter reactor was purged with $N_2$ and 2.7 ml of 25% triisobutyl aluminum in heptane and 1.76 ml of 1% catalyst in mineral oil (0.0157 g) were added. Hydrogen was added to equal a reactor pressure of 60 psig (reactor pressure prior to hydrogen addition is <1 psig). 160 g of propylene was added and the temperature increased to 60° C. (reactor pressure=435 psig). Ethylene was then added to equal a total reactor pressure of 460 psig and was maintained at this level for 4 hours. 53 g of polymer were obtained (catalyst efficiency=3376 g/g catalyst). Properties of the resulting polymer are shown in Table 5. The conditions of Example 16 were the same as those of Example 15 except the hydrogen was added to a total pressure of 100 psig, the reactor pressure prior to ethylene addition was 490 psig and 515 psig after the ethylene addition. 58 g of polymer were produced, having the properties shown in Table 5.

TABLE 5

| Example No. | 15 | 16 |
|---|---|---|
| Hydrogen, psig | 60 | 100 |
| Yield, g | 53 | 58 |
| Catalyst Efficiency, g/g cat. | 3380 | 3694 |
| Melt Viscosity @ 190° C., cps | 19,325 | 6613 |
| Ring & Ball Soft. Pt., °F. | 249 | 236 |
| Needle Pen., 1/10 dmm | 58 | 87 |
| Ethylene, wt. % | 25.4 | 27.3 |
| m/r Ratio | 4.35 | 4.8 |
| Inversion | 0.15 | 0.08 |

As seen from the above data, the m/r ratios of the polymers of Examples 15 and 16 were considerably above the critical value of 4.0 of the present invention and at least 35% above the 1.0 width of the range, over wide ranges of melt viscosity, needle penetration, and softening point.

COMPARATIVE EXAMPLES 17–19

The polymers of comparative Examples 17–19 were prepared under conditions similar to those of Example 11 of U.S. Pat. No. 3,951,935 to Englemann. The catalyst was made as follows: In a 500 ml flask placed in a dry box 17.1 g $Mg(OC_2H_5)_2$ were suspended in 100 ml n-nonane (b.p. 151° C.) with stirring at 100° C. 33 ml of $TiCl_4$ in 40 ml n-nonane were added dropwise. The supernant n-nonane was decanted and the precipitate was washed twice with n-nonane, twice with n-heptane and then dried under vacuum. 17.1 g of light brown powder was obtained.

In Example 17, a 1-liter reactor was charged with 500 ml of Soltrol 100. 0.46 ml of 25% diethylaluminum chloride in heptane (1.5 mmole) and 1.45 ml of 5% catalyst in mineral oil (63.8 mg) were added. 3 psig of hydrogen was added and the temperature increased to 120° C. A gas mixture of 80.2 mole % propylene and 19.8 mole % ethylene was added for 3 hours to maintain a reactor pressure of 106 psig. 74 g of polymer were produced (catalyst efficiency=1160 g/g cat.)

Example 18 was carried out in the same manner except that 15 psig of hydrogen was added and the reactor pressure was maintained at 122 psig with the gas mixture. 76 g of polymer were obtained.

Example 19 differed from Example 17 in that the reactor pressure of 104 psig was maintained with a gas mixture composed of 84.9 mole % propylene and 15.1 mole % ethylene. The properties of the three polymers are shown in Table 6.

TABLE 6

| Example No. | 17 | 18 | 19 |
|---|---|---|---|
| Hydrogen, psig | 3 | 15 | 3 |
| Yield, g | 74 | 76 | 27 |
| Cat. Efficiency, g/g cat. | 1160 | 1191 | 423 |
| Melt Vis. @ 190° C., cps | 7713 | 800 | 5638 |
| Ring & Ball Soft. Pt., °F. | 257 | 243 | 286 |
| Needle Pen., 1/10 dmm | 71 | 123 | 58 |
| Ethylene, wt % | 18.3 | 18.7 | 12.9 |
| m/r Ratio | 3.2 | 3.3 | 3.6 |
| Inversion | 0.40 | 0.25 | 0.60 |

As to the properties of the polymers of Comparative Examples 17–19 showing m/r ratios between 3 and 4, it should be noted that the inversion ratios are significantly higher than those observed in the polymers of the present invention.

Table 7 shows how this inversion ratio is believed to affect the product properties. When polymers produced according to Englemann are compared to polymers produced according to the present invention, i.e., Examples 17 with 5 and 19 with 1, differences in product properties can be seen at similar ethylene content, similar m/r ratio, and similar viscosity. The higher

TABLE 7

| | EFFECT OF INVERSION RATIO ON PRODUCT PROPERTIES | | | | | |
|---|---|---|---|---|---|---|
| Example No. | Melt Viscosity @ 190° C. cps | Ring & Ball Soft. Pt., °F. | Needle Pen., dmm | Ethylene, wt % | m/r Ratio | Inversion Ratio |
| Example 5 | 9210 | 253 | 41 | 17.5 | 3.7 | 0.08 |
| Example 17 | 7713 | 257 | 71 | 18.3 | 3.2 | 0.40 |
| Example 1 | 3000 | 266 | 37 | 12.2 | 3.1 | 0.11 |
| Example 19 | 5638 | 286 | 58 | 12.9 | 3.6 | 0.60 | degree of inversion in Englemann's polymers (0.40 versus 0.08 and 0.60 versus 0.11) causes more disruption of the order along the polymer chain. This, in turn, causes the polymer to lose its integrity as measured by the substantially increased needle penetration at 25° C., i.e., 71 versus 41 and 58 versus 37. In applications of laminating adhesives, this integrity is very important in maintaining a satisfactory bond once the polymer melt has cooled to room temperature. The polymer integrity is also important in packaging operations of the solid polymer where the maintaining of a formed shape is necessary. A polymer with a high needle penetration will deform much more easily than one with a low one.

The higher levels of propylene inversion in the modified examples of U.S. Pat. No. 3,951,935 make these polymers different than those according to the present invention. Although many of the distinguishing features are the same (viscosity, m/r, ethylene content), the increased inversion of the Englemann polymers causes them to have less integrity as measured by needle penetration. In most commercial applications, this is an undesirable property.

It is to be understood that many alterations and modifications can be made to the polymers of this invention. All such departures are considered within the scope of this invention as defined by the specifications and appended claims.

What is claimed is:

1. A substantially amorphous binary random copolymer consisting essentially of from about 10 to about 30 wt. % of ethylene and from about 70 to about 90 wt. % of propylene, said copolymer having a tacticity index m/r ranging between 3.0 and 4.0 and having a propylene inversion value of about 0.15 and below as determined by $^{13}C$ NMR Spectra.

2. The copolymer of claim 1 having a heat of fusion of less than about 0.6 cal/g.

3. The copolymer of claim 1 having a viscosity in the range between about 1000 and about 25,000 cps at 375° F.

4. The copolymer of claim 1 having a ring and ball softening point between about 235° F. and about 300° F.

5. The copolymer of claim 1 having a needle penetration in the range between about 10 and about 75 dmm.

6. The copolymer of claim 1 having an open time between about 10 and about 60 seconds.

7. The copolymer of claim 1 having a total ash content of less than about 500 ppm.

8. The copolymer of claim 1 having a titanium content of no more than about 2 ppm.

* * * * *